US012799424B2

(12) United States Patent
Sharma et al.

(10) Patent No.: US 12,799,424 B2
(45) Date of Patent: Nov. 17, 2026

(54) **PROCESS FOR EXTRACTION OF ESSENTIAL OIL FROM *VALERIANA JATAMANSI* JONES**

(71) Applicant: COUNCIL OF SCIENTIFIC AND INDUSTRIAL RESEARCH AN INDIAN REGISTERED BODY INCORPORATED UNDER THE REGN. OF SOC. ACT (ACT XXI OF 1860), New Delhi (IN)

(72) Inventors: Mohit Sharma, Palampur Himachal (IN); Harish Kumar, HP Himachal Pradesh (IN); Vivesh Sood, Palampur Himachal (IN); Rajeev Kumar, Gaya Bihar (IN)

(73) Assignee: COUNCIL OF SCIENTIFIC AND INDUSTRIAL RESEARCH AN INDIAN REGISTERED BODY INCORPORATED UNDER THE REGN. OF SOC. ACT (ACT XXI OF 1860), New Delhi (IN)

( * ) Notice: Subject to any disclaimer, the term of this patent is extended or adjusted under 35 U.S.C. 154(b) by 438 days.

(21) Appl. No.: 18/695,640

(22) PCT Filed: Sep. 27, 2022

(86) PCT No.: PCT/IN2022/050863
§ 371 (c)(1),
(2) Date: Mar. 26, 2024

(87) PCT Pub. No.: WO2023/053136
PCT Pub. Date: Apr. 6, 2023

(65) Prior Publication Data
US 2025/0002807 A1 Jan. 2, 2025

(30) Foreign Application Priority Data
Sep. 29, 2021 (IN) ............................ 202111044179

(51) Int. Cl.
*C11B 9/02* (2006.01)
*B01D 3/38* (2006.01)

(52) U.S. Cl.
CPC ................ *C11B 9/025* (2013.01); *B01D 3/38* (2013.01); *C11B 9/027* (2013.01)

(58) Field of Classification Search
CPC ........... C11B 9/025; C11B 9/027; B01D 3/38; A61K 2236/00; A61K 36/84
See application file for complete search history.

(56) References Cited

FOREIGN PATENT DOCUMENTS

| | | |
|---|---|---|
| CN | 109929679 B | 3/2022 |
| WO | WO-2023053136 A1 | 4/2023 |

OTHER PUBLICATIONS

"British Pharmacopoeia 1988, vol. 1", Her Majesty's Stationary Office, London, England, (1988), 64 pgs.

(Continued)

*Primary Examiner* — Andrew J. Oyer
(74) *Attorney, Agent, or Firm* — Schwegman Lundberg & Woessner, P.A.

(57) ABSTRACT

The present invention discloses a process for extraction of oil from the *Valeriana jatamansi* Jones by Supercritical Fluid extraction (SFE) process with and without co-solvent. The extraction method is performed on the comminuted *Valeriana jatamansi* Jones using different mesh size of root/rhizome under a pressure ranging from about 220-360 bar and temperature about 45° C. utilizing carbon dioxide as a supercritical fluid. Further the volatile fractions are separated from the supercritical fluid at reduced pressure in the range of about 10-60 bar. Later the same material has been extracted with polar solvent (ethanol) as the co-solvent. The qualitative comparison of essential oil has been done between the essential oil obtained from Hydro distillation and Supercritical Fluid Extraction.

9 Claims, 6 Drawing Sheets

(56) References Cited

OTHER PUBLICATIONS

"International Application No. PCT/IN2022/050863, Amendments Under Article 19 filed Feb. 9, 2023", (Feb. 9, 2023), 7 pgs.
"International Application No. PCT/IN2022/050863, International Search Report and Written Opinion mailed Dec. 9, 2022", (Dec. 9, 2022), 7 pgs.
Chakraborty, Soumendra, et al., "Paradigm of demographic stochasticity-Way to extinction of *Valeriana jatamansi* Jones, a valuable Medicinal plant in North Eastern Himalayan Region", Eco. Env. & Cons. 21 (1) : 2015; pp. (521-528), (2015), 521-528.
Dai, Hui, et al., "Combined NMR and LC-DAD-MS Analysis Reveals Comprehensive Metabonomic Variations for Three Phenotypic Cultivars of Salvia Miltiorrhiza Bunge", Journal of Proteome Research 2010, 9, 1565-1578, (Jan. 18, 2010), 1565-1578.
Dai, Hui, et al., "Combined NMR and LC-MS Analysis Reveals the Metabonomic Changes in Salvia miltiorrhiza Bunge Induced by Water Depletion", J. Proteome Res. 2010, 9, 3, 1460-1475, (Jan. 3, 2010), 1460-1475.
Feng, Yi-Xi, et al., "Contact toxicity and repellent efficacy of *Valerianaceae* spp. to three storedproduct insects and synergistic interactions between two major compounds camphene and bornyl acetate", Ecotoxicology and Environmental Safety 190 (2020) 110106, (Dec. 23, 2019), 10 pgs.
Gupta, L. K., et al., "Cultivation and importance of Valeriana wallichil in the hills of Uttar Pradesh", Indian Drugs, 1981, vol. 18, No. 11, 393-395 ref. 5, (1981), 393-395.
He, Xingchao, et al., "Genotypic and Environmental Effects on the Volatile Chemotype of Valeriana jatamansi Jones", Frontiers in Plant Science, vol. 9, Article 1003, (Jul. 10, 2018), 10 pgs.
Jain, S. K., "Medicinal Plants", National Book Trust, India, New Delhi, (1968), 102 pgs.
Kaul, M. K., et al., "Response of medicinal plants to changed habitats and altitudes", Journal of Tropical Medicinal Plants, 2000, vol. 1, No. 1/2, 125-137 ref. 4, (2000), 125-137.
Mathela, Chandra S., et al., "Compositional Diversity of Terpenoids in the Himalayan Valeriana Genera", Chemistry & Biodiversity, vol. 2, Issue 9, (Sep. 2005), 1174-1182.
Pandian, D. Sugumar, et al., "Comparison of Chemical Composition and Antioxidant Potential of Hydrodistilled Oil and Supercritical Fluid CO2 Extract of Valeriana wallichi DC", Journal of Natural Products and Resources 1(1) (2015) 25-30; XP093056019, (Oct. 23, 2015), 25-30.
Pandian, D. Sugumar, et al., "Comparison of Chemical Composition and Antioxidant Potential of Hydrodistilled Oil and Supercritical Fluid CO2 Extract of Valeriana wallichi DC", Journal of Natural Products and Resources 1(1) (2015) 25-30, (Oct. 23, 2015), 25-30.
Patan, Afroz, et al., "Valeriana Jatamansi: An Ethnobotanical Review", Asian J Pharm Clin Res, vol. 11, Special Issue 4, 2018, 38-40, (2018), 38-40.
Polunin, Oleg, et al., "Concise Flowers of the Himalaya First Edition", Oxford University Press, London, England, (Dec. 3, 1987), 426 pgs.
Prakash, V., "Indian Valerianaceae: a monograph on medicinally important family", Scientific Publishers, 1999, India, (1999), 72 pgs.
Raina, Archana P., et al., "Essential Oil Composition of Valeriana Jatamansi Jones from Himalayan Regions of India", Indian J Pharm Sci 2015;77(2):218-222, (2015), 218-222.
Safaralie, Asghar, et al., "Essential oil composition of *Valeriana officinalis* L. roots cultivated in Iran: Comparative analysis between supercritical CO2 extraction and hydrodistillation", Journal of Chromatography A, vol. 1180, Issues 1-2, Feb. 8, 2008, pp. 159-164, (Dec. 14, 2007), 159-164.
Sangwan, N. S., et al., "Regulation of essential oil production in plants", Plant Growth Regulation 34: 3-21, 2001, (2001), 3-21.
Sharma, P. K., et al., "Ethnobotanical notes on some medicinal and aromatic plants of Himachal Pradesh", Indian Journal of Traditional Knowledge 4(4): 424-428, (2005), 424-428.
Sharma, R., "Medicinal Plants of India an Encylopedia, Daya Publishing House, Delhi: 33-34", (2003), 302 pgs.
Singh, R. D., et al., "Seasonal variation of bioactive components in Valeriana jatamansi from Himachal Pradesh, India", Industrial Crops and Products, vol. 32, Issue 3, Nov. 2010, pp. 292-296, (Nov. 2010), 292-296.
Verma, Ram S., et al., "Chemical diversity in the essential oil of Indian valerian (Valeriana jatamansi Jones)", Chem Biodivers. Oct. 2011;8(10):1921-9. doi: 10.1002/cbdv.201100059, (Oct. 2011), 1921-1929.
Zhi-Yong, Yan, et al., "Action of Valeriana jatamansi Jones on the Apoptosis-related Genes Expression in the Anxiety Model of Rat", Procedia Environmental Sciences 8 (2011) 744-750, (Nov. 25, 2011), 744-750.

PROCESS FOR EXTRACTION OF ESSENTIAL OIL FROM *VALERIANA JATAMANSI* JONES

PRIORITY CLAIM TO RELATED APPLICATIONS

This application is a U.S. national stage filing under 35 U.S.C. § 371 from International Application No. PCT/IN2022/050863, filed on 27 Sep. 2022, and published as WO2023/053136 on 6 Apr. 2023, which claims the benefit under 35 U.S.C. 119 to India application No. 202111044179, filed on 29 Sep. 2021, the benefit of priority of each of which is claimed herein, and which applications and publication are hereby incorporated herein by reference in their entirety.

FIELD OF THE INVENTION

The present invention relates to a process for extraction of essential oil from *Valeriana jatamansi* Jones. More specifically, the present invention relates to a process for extraction of volatile compound from *Valeriana jatamansi* Jones which takes less extraction time with enhanced yield of essential oil with higher content of Patchouli alcohol as compared to traditional methods of essential oil distillation. The present invention relates to a process for extraction of essential oil from *Valeriana jatamansi* Jones by Supercritical Fluid Extraction process with supercritical carbon dioxide alone and with ethanol as co-solvent. More particularly the present invention relates to a process for extraction of essential oil with sweet fragrance containing high percentage of Patchouli alcohol from *V. jatamansi* with superior yield in less time than conventional process.

BACKGROUND OF THE INVENTION

*Valeriana jatamansi* Jones popularly known as Indian Valerian (Mushkbala in Hindi/Kashmiri, Suganthdhawala or Tagara in Sanskrit) is distributed in all temperate regions of the world except Australia (Jain, 1968, Medicinal Plants. National Book Trust, India, New Delhi, 154 pp; Polunin and Stainton, 1987, Concise Flowers of the Himalya. Oxford University Press, London; 255 pp) and is an erect pubescent herb, having horizontal, thick rootstock/rhizomes, with thick descending fibrous roots [R. Sharma (2003) Medicinal plants of India—An Encyclopedia. Daya Publishing House, New Delhi]. The genus *Valeriana*, belongs to the family Valerianacea represented by eight genera and about 350 species which are distributed between the elevation ranging from an altitude of 1500 to 4000 m above sea level and represent a rich biodiversity of Himalayan region (Prakash, 1999, Indian Valerianaceae: A Monograph on a Medicinally Important Family, Scientific Publishers, Jodhpur, India, pp. 72 pp). Among them in India, 16 species were found and out of them two subspecies of genus and five species in-habitat at higher altitude range of Central Himalayas (Arfroz Patan et. al., 2018 *Valeriana jatamansi*: an Ethnobotanical review, Asian Journal of Pharmaceutical and Clinical Research, 11 (4)) It is grown in Himachal Pradesh, northern part of U.P (now Uttarakhand), Sikkim and newly introduced in West Bengal Darjeeling region. It is enlisted in the endangered category by IUCN (Kaul and Handa, 2000, Response of medicinal plants to changed habitats and altitudes Journal of Tropical Medicinal Plants Vol. 1 No. 1/2 pp. 125-137) and is enlisted as an endangered species in the national medicinal plant board, New Delhi [S. Chakraborty et. al, 2015 Paradigm of demographic stochasticity-Way to extinction of

*Valeriana jatamansi* Jones, a valuable Medicinal plant in North Eastern Himalayan Region Eco. Env. & Cons., 21 (1) pp 521-528]. *Valeriana jatamansi* is well distributed in the various district of Himachal Pradesh including Chamba, Kullu, Shimla, Mandi, and hilly region of other districts too.

The whole plant, as a constituent of the Ayurvedic medicine, is used as a hypnotic and to treat nervous debility, failing reflexes, and spastic disorders [L. K. Gupta et. al., 1981, Indian Drugs, 18, 393]. It is also used for curing obesity, nervous disorders, epilepsy, insanity, snake poisoning, eye trouble, and skin diseases [C. S. Mathela et. al, 2005, Chem. Biodiversity 2, 1174] [P. K. Sharma et. al., 2005, Indian J. Trad. Know., 4, 424]. It is the counterpart of the European *V. officinalis* L., an official drug in the British [British Pharmacopoeia, 1988, Her Majestys Stationary Office, London] and European Pharmacopeia [Ram S. Verma et. al., 2011, Chemical Diversity in the Essential Oil of Indian Valerian (*Valeriana jatamansi* Jones) Chemistry & Biodiversity—Vol. 8, Pg 1921-1929] Despite intensive research efforts, the pharmacological actions accounting for the clinical efficacy of valerian remain unclear. The *Valeriana jatamansi* Jones can play an important role in regulating the abnormal apoptosis-related gene expression in the anxiety model of rat. [Yan Zhi-yonga et. al., 2011. Action of *Valeriana jatamansi* Jones on the Apoptosis-related Genes Expression in the Anxiety Model of Rat]

The essential oil yield in the fresh roots and rhizomes of different populations of *V. jatamansi* reported varied from 0.3 to 2.1% [Ram S. Verma et. al, Chemical Diversity in the Essential Oil of Indian Valerian (*Valeriana jatamansi* Jones) Chemistry & Biodiversity—Vol. 8, pg 1921-1929; R. D. Singh et. al., 2010 Industrial Crops and Products, 32, 292-296, R. Sharma, 2003 Medicinal plants of India—An Encyclopedia. Daya Publishing House, New Delhi, Archana P. Raina et. al., 2015, Essential Oil Composition of *Valeriana jatamansi* Jones from Himalayan Regions of India Indian Journal of Pharmaceutical Sciences 77(2):218-222] and used in pharmaceutical industries and aroma industries. The essential oil composition was explored and was considered to be largely influenced by plant's location of growing (Verma et al., 2011, Chemical Diversity in the Essential Oil of Indian Valerian (*Valeriana jatamansi* Jones) Chemistry & Biodiversity-Vol. 8, Pg 1921-1929). The essential oil of *Valeriana jatamansi* Jones contains fragrant monoterpenoids and sesquiterpenoids. Populations rich in Patchouli alcohol, with contents >60%, may be utilized as an alternate source of this compound in the perfumery industry. It is well-documented that chemical phenotypes (chemotypes) of several herbal medicines depends on the environment they grow (He X, Wang S et al (2018) Genotypic and Environmental Effects on the Volatile Chemotype of *Valeriana jatamansi* Jones. Front. Plant Sci. 9:1003. doi: 10.3389/fpls.2018.01003; Dai et al., 2010 Combined NMR and LC-DAD-MS analysis reveals comprehensive metabonomic variations for three phenotypic cultivars of *Salvia miltiorrhiza* bunge. *J. Proteome Res.* 9, 1565-1578. doi: 10.1021/pr901045c, Combined NMR and LC-MS analysis reveals the metabonomic changes in *Salvia miltiorrhiza* bunge induced by water depletion. J. Proteome Res. 9, 1460-1475. doi: 10.1021/pr900995 m).

Recently, some researchers have studied the SFE extraction of *V. jatamansi*. The process conditions used are extraction temperature of 50~55° C., extraction pressure of 30~35 MPa, and flow rate of carbon dioxide of 30~50 kg/h extraction 100~150 min. The invention can achieve yield (3.3%).

The methods reported consumes high energy (CN109929679) and the consumption of $CO_2$ gas was very much higher. Moreover, optimized process of extraction of essential oil with SFE (D. Sugumar Pandian et. al., Comparison of Chemical Composition and Antioxidant Potential of Hydrodistilled Oil and Supercritical Fluid $CO_2$ Extract of *Valeriana wallichii* DC Journal of Natural Products and Resources 1 (1), 25-30; Feng, et al 2020, Ecotoxicol Environ Saf. 2020 Mar. 1; 190:110106. doi: 10.1016/j.ecoenv.2019.110106) is not illustrated and modified effect of particle size on the yield of essential oil had not been mentioned anywhere. All the prior art process mentioned consumes higher energy, high $CO_2$ consumption with maximum yield of 3.3% which is low in comparison to present invention. In addition to this, there is no work reported on SFE with co-solvent.

Commercially, these volatile plant metabolites have already found extensive cosmetic and therapeutic applications (Sangwan et al., 2001, Plant Growth Regul. 34, 3-21. doi: 10.1023/A: 1013386921596). However, oils extracted by organic solvents such as n-hexane or petroleum ether are always doubtful for its safe usage. Hence, supercritical carbon dioxide fluid extraction (SFE) seems to be a good solution in this scenario. SFE offers the usage of non-toxic, non-explosive, environmentally friendly, cost effective, time saving and selectivity-adjustable solvent (supercritical carbon dioxide fluid) in the extraction. Moreover, it also enables the oil extraction to be carried out at low temperature which yields the essential oil having pleasant smell due to higher percentage of Patchouli alcohol in it and complete removal of solvent at the final stage of the extraction.

OBJECTIVES OF THE INVENTION

The objective of the present invention is to provide a process for extraction of essential oil from *Valeriana jatamansi* Jones with non-polar solvent i.e. $CO_2$.

Another, objective of the present invention is to provide a process for extraction of essential oil containing volatile compounds from *Valeriana jatamansi* Jones by supercritical fluid extraction process along with extraction in a polar solvent (Ethanol) as co-solvent.

Yet another object of the present invention is to optimize the conditions for supercritical fluid extraction of *Valeriana jatamansi* Jones.

Yet another object of the present invention is to optimize the conditions for Supercritical Fluid Extraction of *Valeriana jatamansi* Jones by regulating the particle size of the raw material.

Yet another objective of the invention is to study the effect on chemical composition of essential oil at different conditions.

Yet another object of the present invention is to study the difference in essential oil yield at different extraction conditions of Supercritical Fluid Extraction (SFE).

Yet another object of the present invention is to study the effect of particle size of raw material on the essential oil yield by Supercritical Fluid Extraction (SFE) and Hydro-distillation.

Yet another object of the present invention is to study the comparison between the chemical composition of essential oil obtained from Supercritical Fluid Extraction (SFE) and Hydro-distillation.

Another, objective of the present invention is to study the comparative yield of the essential oil of *Valeriana jatamansi* Jones obtained from different extraction methods i.e., Hydro-distillation (in Clevenger type apparatus) and Supercritical Fluid Extraction.

SUMMARY OF THE INVENTION

Accordingly, the present invention provides a Supercritical Fluid Extraction (SFE) process for extraction of oil from the *Valeriana jatamansi* Jones comprising the steps of, a) grinding the *Valeriana jatamansi* Jones root/rhizome and b) extracting the grounded root/rhizome using supercritical carbon dioxide ($CO_2$) in Supercritical Carbon Dioxide Extractor, wherein particle size of the rhizome/root is in a range of 0.50-4.75 mm and the process is conducted at a pressure range of 200 to 400 bars and a temperature range of 35° C. to 50° C.

In an embodiment of the present invention comprising further extracting the grounded root/rhizome in presence of a polar co-solvent.

In a preferred embodiment of the present invention the polar co-solvent is ethanol.

In an embodiment of the present invention the carbon dioxide consumption in the Supercritical Fluid Extraction (SFE) process is in a range of 1:10 to 1:19.

In a preferred embodiment of the present invention the essential oil yield at a temperature of 45° C. and a pressure range of 220 to 310 bars is 1.6 to 4.1%.

In a preferred embodiment of the present invention the essential oil yield at a temperature of 45° C. and a pressure of 310 bars is 4.1%.

In a preferred embodiment of the present invention the essential oil yield at a temperature of 45° C. and a pressure of 310 bars with the particle size of grounded root/rhizome in the range of 0.50-4.75 mm is 0.073-4.1%.

In a preferred embodiment of the present invention the essential oil yield at a temperature of 45° C. and a pressure of 310 bars for the particle size in the range of 0.50-1.00 mm is 4.1% without co-solvent and 2.18% with co-solvent.

In an embodiment of the present invention the essential oil obtained from the Supercritical Fluid Extraction (SFE) process comprises 68.36% to 69.35% Patchouli alcohol.

In an embodiment of the present invention the essential oil obtained from the supercritical fluid Extraction (SFE) with ethanol as co-solvent comprises 53.73% to 55.86% concentration of Patchouli alcohol.

In another embodiment, the invention provides an optimized particle size for hydro distillation in which essential oil yield has been found higher in reduced time.

In still another embodiment, the invention provides optimized condition of Supercritical Fluid Extraction (SFE) process for extracting essential oil of *Valeriana jatamansi* Jones with higher yield.

The present invention compares the effect of the particle size of the raw material on the essential oil yield by Supercritical Fluid Extraction and hydro-distillation.

In yet another embodiment, the invention provides the variation in composition of patchouli alcohol at different extraction conditions.

In yet another embodiment, the invention compares the chemical constituents of essential oil extracted from Supercritical Fluid Extraction and Hydro-distillation.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION OF THE INVENTION

Figure 1:
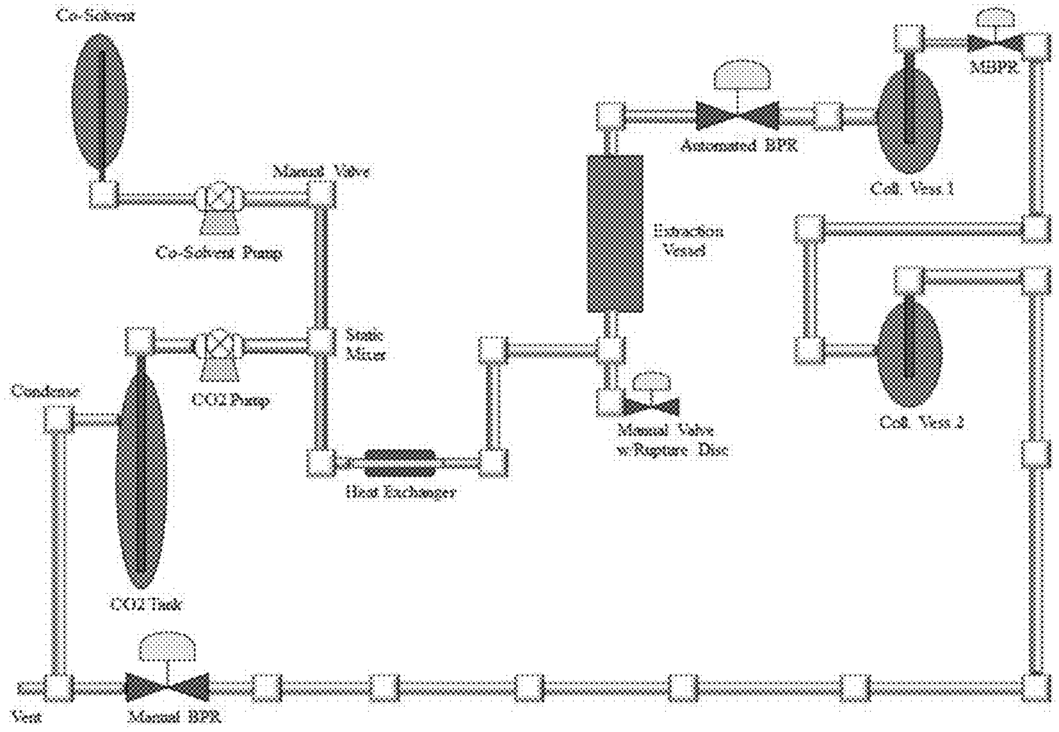
FIG. 1 shows the schematic flow diagram of supercritical $CO_2$ fluid extraction apparatus from left to right; viz. $CO_2$ supply tank, $CO_2$ pump, co-solvent supply, co-solvent pump, manual valve, Heat exchanger, Extractor, Automated back pressure regulator, collection vessel 1, collection vessel 2, in accordance with an embodiment of the present disclosure.

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles “a”, “an” and “the” are used to refer to one or to more than one (i.e., to at least one) of the grammatical object of the article.

The terms “comprise” and “comprising” are used in the inclusive, open sense, meaning that additional elements may be included. It is not intended to be construed as “consists of only”. Throughout this specification, unless the context requires otherwise the word “comprise”, and variations such as “comprises” and “comprising”, will be understood to imply the inclusion of a stated element or step or group of element or steps but not the exclusion of any other element or step or group of element or steps.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature in the range of 35-50° C. should be interpreted to include not only the explicitly recited limits of 35° C.-50° C. but also to include sub-ranges, such as 41-49° C., and so forth, as well as individual amounts, within the specified ranges, such as 35.2° C., 40.5° C., and so on.

The present invention provides a Supercritical Fluid Extraction of *Valeriana jatamansi* Jones. The plant specimen with leaf, stem, root (rhizome) and flower of *Valeriana jatamansi* Jones were collected from Garhmata, Chamba District in Himachal Pradesh (alt 2487 m asl). The plant material was submitted in the herbarium of CSIR-Institute of Himalayan Bioresource Technology, Palampur, Himachal Pradesh-176061, India and were identified with a voucher specimen (no. PLP15400). *Valeriana jatamansi* Jones root/rhizome were cleaned and dried in shade at room temperature and then stored in moisture free place.

The material was powdered in a grinder so that it got crushed into different particle sizes. The grounded material of different particle size was subjected to the sieve shaker using standard test sieves to separate the material into different particle size and stored in the dry and cool place prior to extraction. Later Hydro distillation of different particle size of raw material had been done using Clevenger-type apparatus attached to round bottom flask. The distillation process was carried out till all the essential oil was extracted from raw material.

Figure 2:
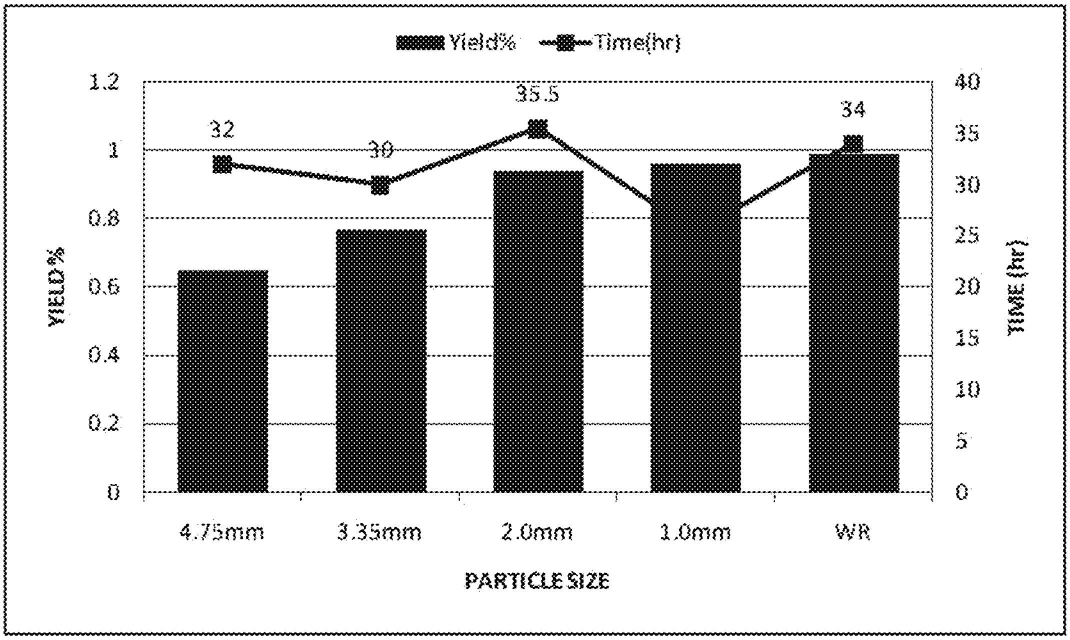
FIG. 2 illustrates comparative study of percentage yield of essential oil obtained with time from different particle size and whole rhizome of *Valeriana jatamansi* Jones in HD. *WR=Whole Rhizome, in accordance with an embodiment of the present disclosure.

The sample collected were dried over anhydrous sodium sulfate, measured, and stored at 4° C. for chromatographic analysis. The recovery (i.e., percentage) of essential oil was estimated on (v/w) on dry weight basis. The effect of different particle size on the yield of essential oil with respect to the time has been observed and it had been noted that the yield was highest in 0.50-1.00 mm size and whole rhizome but the extraction time in case of 0.50-1.00 mm particle size was 8.5 hr. less than that of whole rhizome. Hence it had been concluded that 0.50-1.00 mm particle size is best for Hydro distillation. The yield of essential oil of different particle size with respect to time has been shown in FIG. 2.

Supercritical Fluid Extraction of different particle size of raw material was carried out at different extraction conditions i.e. pressure and temperature. In the process, as the system attains equilibrium, it was kept under static condition for 30 min. Later, the extraction was carried out for 90-120 min under the dynamic condition with the $CO_2$ flow rate of 60 g/min. The first separator CS1 was set at 50-60 bar and −10° C. and the second separator CS2 was set at pressure 10-20 bar and 5° C. All the experiments were conducted in triplicate to get the average yield of each experiment. These samples were dried over anhydrous sodium sulfate, filtered, and stored at 4° C. until analysis. The recovery (i.e., percentage) content of essential oil through SFE process was estimated on (w/w) on dry weight basis. Later the same raw material had been extracted in supercritical fluid extraction with polar co-solvent too and effect of particle size on essential oil yield and composition had also been noted there.

The essential oil yield obtained from the different particle size of the raw material i.e. *Valeriana jatamansi* Jones by both type of extraction process i.e. Hydro-distillation and Supercritical Fluid Extraction were compared.

The present invention relates to a process for extraction of volatile components from *V. jatamansi* plant. The inventive aspect of the invention is that a rapid, efficient, and economical optimized process is disclosed wherein combination of preconditioning of raw material into definite particle size without loss of volatile components with hydro distillation, combination of supercritical $CO_2$ and supercritical $CO_2$ with co-solvent at definite optimum process conditions, flow rate is used for extraction of volatile components with superior yield and less $CO_2$ gas consumption. The prior art discloses method with less yield and high consumption of $CO_2$ gas as compared to present invention.

The chemical constituents, volatile compounds of essential oil sample were analyzed with GC-MS. Identification of constituent's compound was carried out with the help of relative retention indices using homologous series of n-alkane ($C_9$-$C_{22}$) and by comparison of mass spectral data available in the literature of NIST Database and the data listed in the edition of Adam's book.

In an embodiment of the present disclosure, there is provided a Supercritical Fluid Extraction (SFE) process for extraction of oil from *Valeriana jatamansi* Jones comprising the steps of: a) grinding the *Valeriana jatamansi* Jones root/rhizome; and b) extracting the grounded root/rhizome using supercritical carbon dioxide ($CO_2$) in Supercritical Carbon Dioxide Extractor, wherein particle size of rhizome/root is in a range of 0.50-4.75 mm; and the process is conducted at a pressure range of 200 to 400 bars and a temperature range of 35° C. to 50° C.

In an embodiment of the present disclosure, there is provided a Supercritical Fluid Extraction (SFE) process for extraction of oil from *Valeriana jatamansi* Jones as disclosed herein, comprising further extracting the grounded root/rhizome in presence of a polar co-solvent.

In an embodiment of the present disclosure, there is provided a Supercritical Fluid Extraction (SFE) process for extraction of oil from *Valeriana jatamansi* Jones as disclosed herein, comprising further extracting the grounded root/rhizome in presence of a polar co-solvent and the polar co-solvent is ethanol.

In an embodiment of the present disclosure, there is provided a Supercritical Fluid Extraction (SFE) process for extraction of oil from *Valeriana jatamansi* Jones as disclosed herein, wherein the root/rhizome to carbon dioxide consumption is in a range of 1:10 to 1:19.

In an embodiment of the present disclosure, there is provided a Supercritical Fluid Extraction (SFE) process for extraction of oil from *Valeriana jatamansi* Jones as disclosed herein, wherein the essential oil yield at a temperature of 45° C. and a pressure range of 220 to 310 bars is 1.6 to 4.1%.

In an embodiment of the present disclosure, there is provided a Supercritical Fluid Extraction (SFE) process for extraction of oil from *Valeriana jatamansi* Jones as disclosed herein, wherein the essential oil yield at a temperature of 45° C. and a pressure of 310 bars is 4.1%.

In an embodiment of the present disclosure, there is provided a Supercritical Fluid Extraction (SFE) process for extraction of oil from *Valeriana jatamansi* Jones as disclosed herein, wherein the essential oil yield at a temperature of 45° C. and a pressure of 310 bars with the particle size of the grounded root/rhizome in a range of 0.50-4.75 mm is 0.073-4.1%.

In an embodiment of the present disclosure, there is provided a Supercritical Fluid Extraction (SFE) process for extraction of oil from *Valeriana jatamansi* Jones as disclosed herein, wherein the essential oil yield at a temperature of 45° C. and a pressure of 310 bars for the particle size of the grounded root/rhizome in a range of 0.50-1.00 mm is 4.1% without the co-solvent and 2.18% with the co-solvent.

In an embodiment of the present disclosure, there is provided a Supercritical Fluid Extraction (SFE) process for extraction of oil from *Valeriana jatamansi* Jones as disclosed herein, wherein the essential oil comprises 68.36% to 69.35% Patchouli alcohol.

In an embodiment of the present disclosure, there is provided a Supercritical Fluid Extraction (SFE) process for extraction of oil from *Valeriana jatamansi* Jones as disclosed herein, wherein the essential oil obtained from the Supercritical Fluid Extraction (SFE) with ethanol as co-solvent comprises 53.73% to 55.86% concentration of Patchouli alcohol.

In an embodiment of the present disclosure, there is provided a Supercritical Fluid Extraction (SFE) process for extraction of oil from *Valeriana jatamansi* Jones comprising the steps of: a) grinding the *Valeriana jatamansi* Jones root/rhizome; and b) extracting the grounded root/rhizome using supercritical carbon dioxide ($CO_2$) in Supercritical Carbon Dioxide Extractor, wherein particle size of rhizome/root is in a range of 0.50-4.75 mm; and the process is conducted at a pressure range of 200 to 400 bars and a temperature range of 35° C. to 50° C.; the process comprising further extracting the grounded root/rhizome in presence of a polar co-solvent.

In an embodiment of the present disclosure, there is provided a Supercritical Fluid Extraction (SFE) process for extraction of oil from *Valeriana jatamansi* Jones comprising the steps of: a) grinding the *Valeriana jatamansi* Jones root/rhizome; and b) extracting the grounded root/rhizome using supercritical carbon dioxide ($CO_2$) in Supercritical Carbon Dioxide Extractor, wherein particle size of rhizome/root is in a range of 0.50-4.75 mm; and the process is conducted at a pressure range of 200 to 400 bars and a temperature range of 35° C. to 50° C.; the process comprising further extracting the grounded root/rhizome in presence of ethanol as a polar co-solvent.

In an embodiment of the present disclosure, there is provided a Supercritical Fluid Extraction (SFE) process for extraction of oil from *Valeriana jatamansi* Jones comprising the steps of: a) grinding the *Valeriana jatamansi* Jones root/rhizome; and b) extracting the grounded root/rhizome using supercritical carbon dioxide ($CO_2$) in Supercritical Carbon Dioxide Extractor, wherein particle size of rhizome/root is in a range of 0.50-4.75 mm; and the process is conducted at a pressure range of 200 to 400 bars and a temperature range of 35° C. to 50° C.; and the root/rhizome to carbon dioxide consumption is in a range of 1:10 to 1:19.

In an embodiment of the present disclosure, there is provided a Supercritical Fluid Extraction (SFE) process for extraction of oil from *Valeriana jatamansi* Jones comprising the steps of: a) grinding the *Valeriana jatamansi* Jones root/rhizome; and b) extracting the grounded root/rhizome using supercritical carbon dioxide ($CO_2$) in Supercritical Carbon Dioxide Extractor, wherein particle size of rhizome/root is in a range of 0.50-4.75 mm; and the process is conducted at a pressure range of 200 to 400 bars and a temperature range of 35° C. to 50° C.; and the essential oil yield at a temperature of 45° C. and a pressure range of 220 to 310 bars is 1.6 to 4.1%.

In an embodiment of the present disclosure, there is provided a Supercritical Fluid Extraction (SFE) process for extraction of oil from *Valeriana jatamansi* Jones comprising the steps of: a) grinding the *Valeriana jatamansi* Jones root/rhizome; and b) extracting the grounded root/rhizome using supercritical carbon dioxide ($CO_2$) in Supercritical Carbon Dioxide Extractor, wherein particle size of rhizome/root is in a range of 0.50-4.75 mm; and the process is conducted at a pressure range of 200 to 400 bars and a temperature range of 35° C. to 50° C.; and the essential oil yield at a temperature of 45° C. and a pressure of 310 bars is 4.1%.

In an embodiment of the present disclosure, there is provided a Supercritical Fluid Extraction (SFE) process for extraction of oil from *Valeriana jatamansi* Jones comprising the steps of: a) grinding the *Valeriana jatamansi* Jones root/rhizome; and b) extracting the grounded root/rhizome using supercritical carbon dioxide ($CO_2$) in Supercritical Carbon Dioxide Extractor, wherein particle size of rhizome/root is in a range of 0.50-4.75 mm; and the process is conducted at a pressure range of 200 to 400 bars and a temperature range of 35° C. to 50° C.; and the essential oil yield at a temperature of 45° C. and a pressure of 310 bars is 4.1%.

In an embodiment of the present disclosure, there is provided a Supercritical Fluid Extraction (SFE) process for extraction of oil from *Valeriana jatamansi* Jones comprising the steps of: a) grinding the *Valeriana jatamansi* Jones root/rhizome; and b) extracting the grounded root/rhizome using supercritical carbon dioxide ($CO_2$) in Supercritical Carbon Dioxide Extractor, wherein particle size of rhizome/root is in a range of 0.50-4.75 mm; and the process is conducted at a pressure range of 200 to 400 bars and a temperature range of 35° C. to 50° C.; and the essential oil yield at a temperature of 45° C. and a pressure of 310 bars with the particle size of the grounded root/rhizome in a range of 0.50-4.75 mm is 0.073-4.1%.

In an embodiment of the present disclosure, there is provided a Supercritical Fluid Extraction (SFE) process for extraction of oil from *Valeriana jatamansi* Jones comprising the steps of: a) grinding the *Valeriana jatamansi* Jones root/rhizome; and b) extracting the grounded root/rhizome using supercritical carbon dioxide ($CO_2$) in Supercritical Carbon Dioxide Extractor, wherein the essential oil yield at a temperature of 45° C. and a pressure of 310 bars for the particle size of the grounded root/rhizome in a range of 0.50-1.00 mm is 4.1% without the co-solvent and 2.18% with the co-solvent.

In an embodiment of the present disclosure, there is provided a Supercritical Fluid Extraction (SFE) process for extraction of oil from *Valeriana jatamansi* Jones comprising the steps of: a) grinding the *Valeriana jatamansi* Jones root/rhizome; and b) extracting the grounded root/rhizome using supercritical carbon dioxide ($CO_2$) in Supercritical Carbon Dioxide Extractor, and the essential oil obtained from the Supercritical Fluid Extraction (SFE) with ethanol as co-solvent comprises 53.73% to 55.86% concentration of Patchouli alcohol.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

EXAMPLES

The disclosure will now be illustrated with the working examples, which is intended to illustrate the working of disclosure and not intended to take restrictively to imply any limitations on the scope of the present disclosure. Unless defined otherwise, all technical and scientific terms used herein have the same meaning as commonly understood to one ordinary person skilled in the art to which this disclosure belongs. Although methods and materials similar or equivalent to those described herein can be used in the practice of the disclosed methods and compositions, the exemplary methods, devices, and materials are described herein. It is to be understood that this disclosure is not limited to particular methods, and experimental conditions described, as such methods and conditions may apply.

The following examples are given by way of illustration and therefore should not construe to limit the scope of the present invention.

The plant parts of *Valeriana jatamansi* Jones were collected from Gargmata, Chamba District in Himachal Pradesh (alt 2487 m asl) The plant material was submitted in the herbarium of CSIR-Institute of Himalayan Bioresource Technology, Palampur, Himachal Pradesh 176061, India (voucher specimen No. PLP15400).

Example 1

Preparation of the Different Particle Size Sample of the Material

*Valeriana jatamansi* Jones root/rhizome were cleaned and dried in shade at room temperature and then stored in moisture free place. The material was powdered in a grinder (Mac Willey Mill) so that it got crushed into different particle sizes. The grounded material containing the different particle size material was subjected to the sieve shaker MAC Rotap Sieve Shaker (CAT No. MSW-323) Macro Scientific Works® 10 A/UA Jawahar Nagar Delhi-7 using MAC standard test sieves (i.e. 4.75 mm, 3.35 mm, 2.00 mm, 1.00 mm, 0.5 mm) to categories the material into different particle (i.e., 3.35-4.75 mm, 2.0-3.35 mm, 1.0-2.0 mm, and 0.5-1.0 mm.) size and stored in the dry and cool place prior to extraction.

Example 2

Hydro Distillation of Different Particle Size from *Valeriana jatamansi* Jones 1000 g raw material of each particle size (i.e. 3.35-4.75 mm, 2.0-3.35 mm, 1.0-2.0 mm, and 0.5-1.0 mm.) and whole rhizome of the *Valeriana jatamansi* Jones was subjected to hydro-distillation in Clevenger type apparatus attached to round bottom flask by loading the raw material in the 10 litres round bottom flask. Then 5000-6000 ml of water ($H_2O$) was added to it, so that raw material got dipped in it. The flask was then placed into the heating mantle after cleaning it well around all sides to avoid the contact of water with that of heating mantle. A Clevenger type apparatus fitted with condenser was placed on the neck of round bottom flask.

The heating mantle was turned ON and the initial temperature was set to 100° C. until first drop of condensate comes out of condenser and then it was reduced to 55-60° C. for further distillation. The distillation was carried out for about 25.5-35.5 hrs, depending upon the particle size of raw material and further oil was collected at some particular time intervals to study the kinetics of the same. The oil sample thus collected were measured and dried over anhydrous sodium sulfate. The recovery (%) of essential oil content was estimated on volume/weight (v/w) basis and stored at 4° C. for further analysis.

Optimization of Particle Size for Hydro-Distillation.

The effect of different particle size on the yield of essential oil with respect to time obtained as shown in Table 1. For the particle size 3.35-4.75 mm, 2.0-3.35 mm, 1.0-2.0 mm, and 0.5-1.0 mm average essential oil yield was 0.65%±0.021, 0.77%±0.050, 0.94%±0.026 and 0.96%±0.046 in 32 hrs, 30 hrs, 35.5 hrs and 25.5 hrs of distillation time respectively. For the whole rhizome the yield was obtained 0.99%±0.015 in 34 hrs of distillation time. Therefore, it had been noted that the yield was highest in whole rhizome, little more than 0.50-1.00 mm particle size. However, the rise of few percentage of oil yield in whole rhizome is not economically beneficial as it consumed 8.5 hrs more than the above-mentioned particle size. Hence it had been concluded that 0.50-1.00 mm particle size is best for hydro distillation. Therefore, in this study the essential oil content of *Valeriana jatamansi* Jones obtained from hydro-distillation falling within range of 0.63% to 1.01%. The yield of essential oil of different particle size with respect to time has been shown in FIG. 2. Table 1 shows the total distillation time and percentage yield of essential oil of different particle size in HD. (*WR-Whole Rhizome).

TABLE 1

| Sr. No. | Particle Size(mm) | Time(hrs.) | Yield % |
|---|---|---|---|
| 1. | 0.50-1.00 | 25.5 | 0.96 |
| 2. | 1.00-2.00 | 35.5 | 0.94 |
| 3. | 2.00-3.35 | 30 | 0.77 |
| 4. | 3.35-4.75 | 32 | 0.65 |
| 5. | WR | 34 | 0.99 |

Supercritical Fluid Extraction of Spent of Hydro-Distillation 150 grams of the material of different particle size, after its hydro-distillation had been taken and loaded to 5 liters feed tank of SFE along with 10% (15 grams) co-solvent. As the extraction vessel was tightly sealed, desired extraction conditions had been set up in ABPR and heat controllers. Pressure within the extraction vessel was built up slowly by opening the valve of cylinder regulated by automated back pressure regulator. The high-pressure cyclone separator CS1 and CS2 was set at 50-60 bar at −10° C. and 10-20 bar at +5° C. respectively. The SFE extraction was initiated as the desired extractions i.e., 45° C. and 310 bar respectively were achieved. During the extraction time, flow rate of $CO_2$ was set at 54 gram/minute and flow rate of co-solvent (ethanol) was set at 6 gram/minute (10%). The entire extraction process lasted for 90-120 minutes. As the extraction completed, oil sample along with co-solvent had been collected and subjected to rotary evaporator using Buchi Rotavapor R-300 (Buchilabortechnik AG Meierseggstrasse 40 Postfach CH-9230 Flawil 1 Switzerland) at reduce pressure from 300-20 mbar at temperature 45° C. The total oil obtained from the extraction was recorded and the recovery (%) of essential oil content was estimated on weight/weight (w/w) basis and stored at 4° C. for further analysis.

The effect of different particle size on the yield of essential oil with optimized conditions in supercritical fluid extraction with co-solvent has been observed as shown in Table 2. For the particle size 3.35-4.75 mm, 2.0-3.35 mm, 1.0-2.0 mm and 0.5-1.0 mm average essential oil yield was around 0.23%, 0.26%, 0.26% and 0.33%. Therefore, it was clear from the above mentioned results that 0.50-1.0 mm particle size showed better results in supercritical fluid extraction with co-solvent process as compared to the other particle sizes.

TABLE 2 shows the percentage yield of essential oil of different particle size of spent after Hydrodistillation in SFE at optimized extraction conditions.

| S. No. | Particle Size(mm) | Yield(%) |
|---|---|---|
| 1. | 0.50-1.00 | 0.33 |
| 2. | 1.00-2.00 | 0.26 |
| 3. | 2.00-3.35 | 0.26 |
| 4. | 3.35-4.75 | 0.23 |

Example 3

Supercritical Carbon Dioxide Fluid Extraction for Optimization of Conditions

Figure 3:
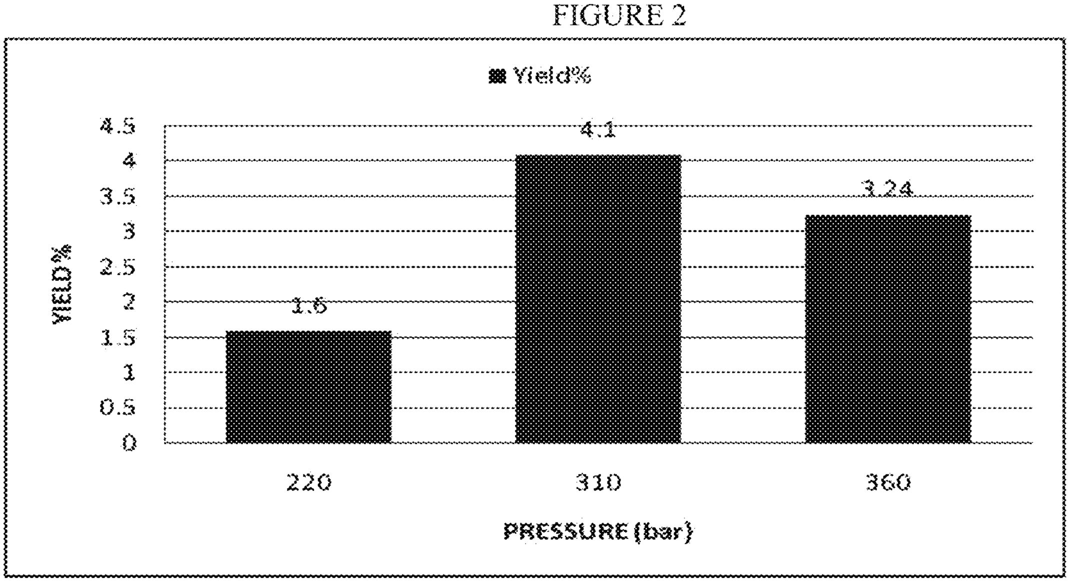
FIG. 3 shows the variation of percentage yield of essential oil from *Valeriana jatamansi* Jones at different pressure extraction conditions in supercritical fluid extraction process in accordance with an embodiment of the present disclosure.

*Valeriana jatamansi* Jones were extracted by using Supercritical Carbon Dioxide Fluid Extractor (Thar 1000 F, Thar Technologies). The Systematic flow diagram of supercritical $CO_2$ Fluid extraction apparatus has been shown in FIG. 1. Briefly, one hundred grams of powdered (0.5-1.0 mm) raw material was placed into a 5 liters feed tank. After the extraction vessel was tightly sealed, extraction was done at different conditions (pressure/temperature) i.e. 220 bar/45° C.; 310 bar/45° C.; 360 bar/45° C. Pressure in the system rises simultaneously till it achieved equilibrium. In the meantime, cyclone separator CS1 and CS2 was set at 50-60 bar at −10° C. and 10-20 bar at +5° C. respectively. As the system is in equilibrium, static mode was NO for 30 minutes. Further, system was kept on dynamic mode for 90-120 minutes with a constant flow rate of carbon dioxide @60 g/min, in each experiment. After the extraction was completed, system was depressurized and the oil was collected from the collection vessel using hexane. The oil sample collected was measure and dried over anhydrous sodium sulfate. The extracted oil with hexane was then filtered and subjected to rotary evaporator using Buchi Rotavapor R-300 (Buchilabortechnik AG Meierseggstrasse 40 Postfach CH-9230 Flawil 1 Switzerland) at reduce pressure from 300-50 mbar at temperature 45° C. The total oil obtained from the extraction was recorded and the recovery (%) of essential oil content was estimated on weight/weight (w/w) basis and stored at 4° C. for further analysis. The yield of extract at different conditions (pressure/temperature) i.e. 220 bar/45° C.; 310 bar/45° C.; 360 bar/45° C. was 1.6%, 4.1%, 3.24% respectively. Hence it had been concluded that extraction condition at 310 bar/45° C. was best for supercritical fluid extraction process. The yield of the extract comes was found to be at higher side at 310 bar pressure and 45° C. in comparison to other extraction conditions. The variation of essential oil yield at different extraction conditions in supercritical fluid extraction method have been shown in FIG. 3.

Example 4

Supercritical Carbon Dioxide Fluid Extraction for Different Particle Size of Raw Material at Optimized Condition.

Raw material of *Valeriana jatamansi* Jones with different particle size (i.e., 3.35-4.75 mm, 2.0-3.35 mm, 1.0-2.0 mm, and 0.5-1.0 mm.) were extracted by using Supercritical Carbon Dioxide Extractor (Thar 1000 F. Thar Technologies) under optimized conditions as mentioned above. Briefly, one hundred grams of grounded raw material of different particle size was placed into a 5 litre extraction feed. After the extraction vessel was tightly sealed, the desired extraction temperature was set on automated back pressure regulator (ABPR). Pressure within the extraction vessel was built up slowly by opening the valve of cylinder regulated by automated back pressure regulator. The high-pressure cyclone separator CS1 and CS2 was set at 50-60 bar at −10° C. and 10-20 bar at +5° C. respectively. The SFE extraction was initiated after the desirable temperature and pressure i.e. 45° C. and 310 bar respectively were achieved. The entire extraction process lasted for 90-120 minutes with a constant carbon dioxide flow rate (60 g/min). After the extraction was completed, the extraction vessel was depressurized and the oil was collected from the collection vessel using hexane. The Oil sample thus collected were measure, dried over anhydrous sodium sulfate. The extracted oil with hexane was then filtered and subjected to rotary evaporator using Buchi Rotavapor R-300 (Buchilabortechnik AG Meiersegg-strasse 40 Postfach CH-9230 Flawil 1 Switzerland) at reduce pressure from 300-20 mbar at temperature 45° C. The total oil obtained from the extraction was recorded and the recovery (%) of essential oil content was estimated on weight/weight (w/w) basis and stored at 4° C. for further analysis.

Figure 4:
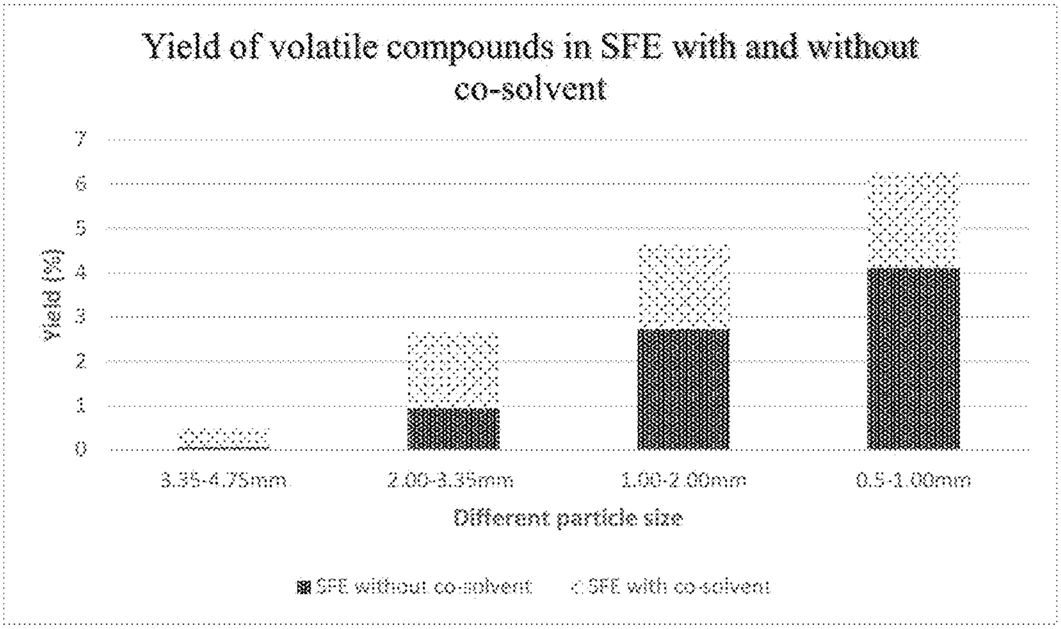
FIG. 4 shows the comparison of percentage yield of essential oil obtained from different particle size of *Valeriana jatamansi* Jones in SFE, *WR=Whole Rhizome, in accordance with an embodiment of the present disclosure.
Figure 5:
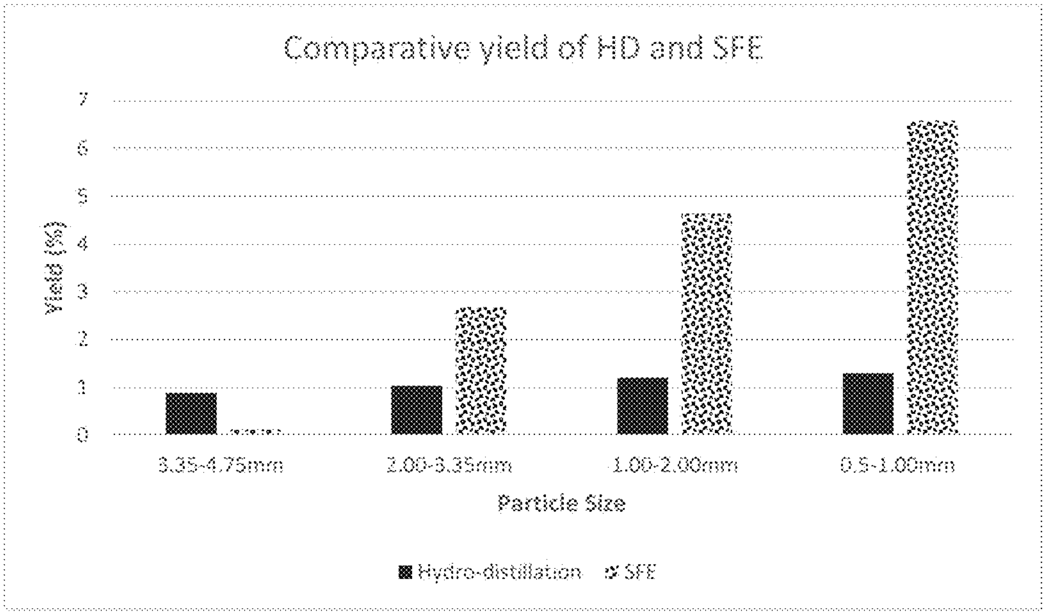
FIG. 5 shows the comparison of percentage yield of essential oil obtained from different particle size of *Valeriana jatamansi* Jones in HD and SFE, in accordance with an embodiment of the present disclosure.
Figure 6:
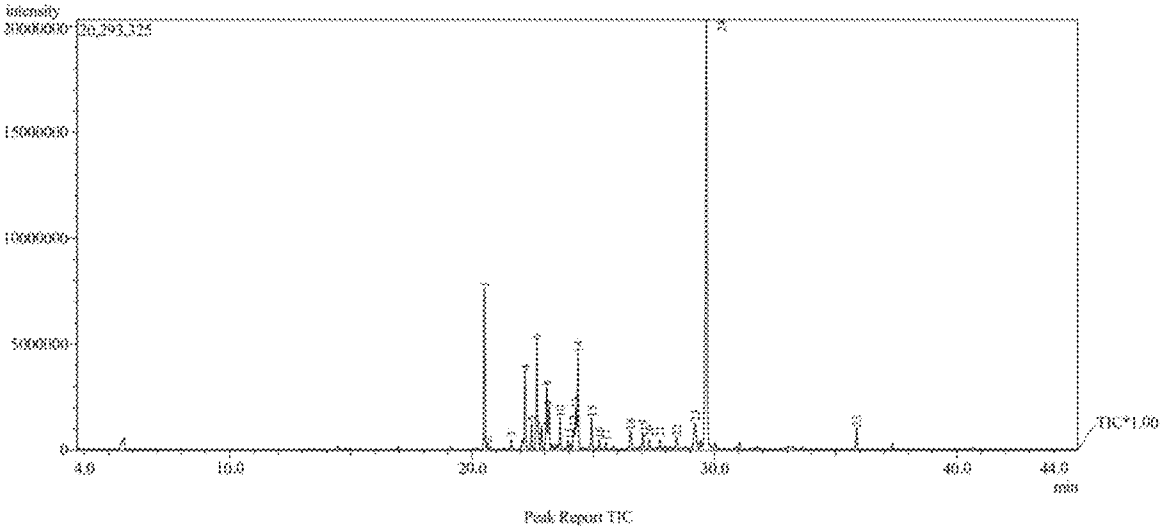
FIG. 6 illustrates GC-MS chromatogram of essential oil of *Valeriana jatamansi* Jones obtained from hydro-distillation of 1.00 mm particle size, in accordance with an embodiment of the present disclosure.
Figure 7:
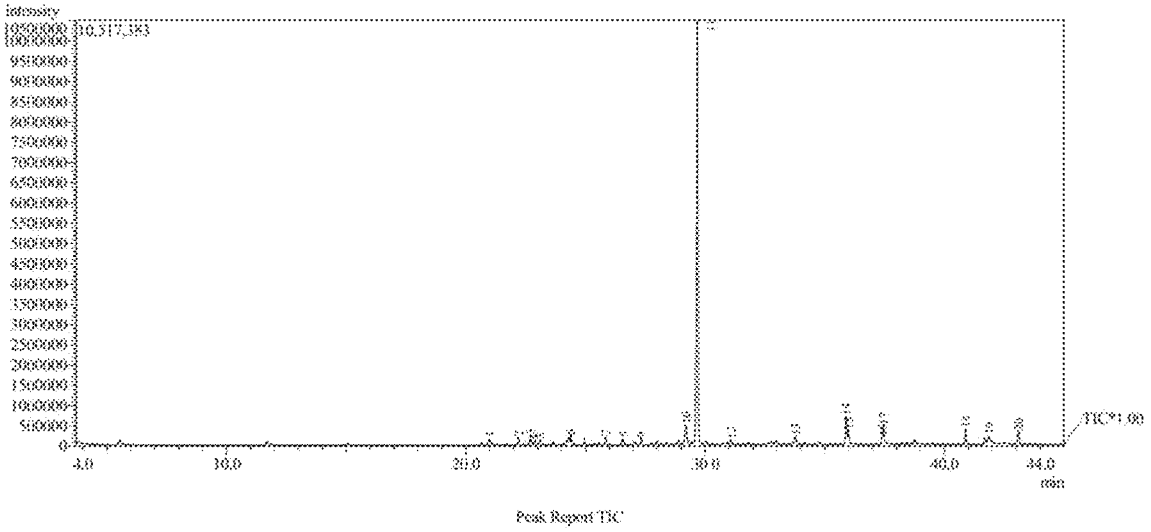
FIG. 7 illustrates GC-MS chromatogram of essential oil of *Valeriana jatamansi* Jones obtained from SFE with $CO_2$ only of 1.00 mm particle size, in accordance with an embodiment of the present disclosure.

The effect of different particle size on the yield of essential oil with optimized conditions in supercritical fluid extraction has been observed as shown in Table 2. For the particle size 3.35-4.75 mm, 2.0-3.35 mm, 1.0-2.0 mm and 0.5-1.0 mm average essential oil yield was 0.073%±0.006, 0.95%±0.016, 2.73%±0.081 and 4.1%±0.095 respectively. For the whole rhizome the yield was obtained 0.396%±0.012. Therefore, it is clear from the above-mentioned results that 0.50-1.0 mm particle size showed better results in Supercritical Fluid Extraction process as compared to the other. The consumption of $CO_2$ in all these was experiments is in the ratio of 1:10 of the raw material. The essential oil yield by the different particle size at optimized condition of supercritical fluid extraction is shown in FIG. 4. Comparison of percentage yield of essential oil obtained from different particle size of *Valeriana jatamansi* Jones in HD and SFE has been shown in FIG. 5.

Table. 3 shows the percentage yield of essential oil of different particle size in SFE at optimized extraction conditions. (*WR-Whole Rhizome)

TABLE 3

| Sr. No. | Particle Size(mm) | Yield % |
|---|---|---|
| 1. | 0.50-1.00 | 4.1 |
| 2. | 1.00-2.00 | 2.73 |
| 3. | 2.00-3.35 | 0.95 |
| 4. | 3.35-4.75 | 0.073 |
| 5. | WR | 0.396 |

Example 5

As per Example-4, after the oil extraction with $CO_2$ in SFE, the material was further extracted with co-solvent (Ethanol). One hundred gram of raw material of different particle size had been loaded with 10% ethanol into a 5 liter extraction feed. As the extraction vessel was tightly sealed, desired extraction conditions had been set up in ABPR and heat controllers. Pressure within the extraction vessel was built up slowly by opening the valve of cylinder regulated by automated back pressure regulator. The high-pressure cyclone separator CS1 and CS2 was set at 50-60 bar at −10° C. and 10-20 bar at +5° C. respectively. The SFE extraction was initiated as the desired extractions i.e. 45° C. and 310 bar respectively were achieved. During the extraction time, flow rate of $CO_2$ was set at 54 gram/minute and flow rate of co-solvent (ethanol) was set at 6 grams/minute (10%). The entire extraction process lasted for 90-120 minutes. As the extraction completed, oil sample along with co-solvent had been collected and subjected to rotary evaporator using Buchi Rotavapor R-300 (Buchilabortechnik AG Meiersegg-strasse 40 Postfach CH-9230 Flawil 1 Switzerland) at reduce pressure from 300-20 mbar at temperature 45° C. The total oil obtained from the extraction was recorded and the recovery (%) of essential oil content was estimated on weight/weight (w/w) basis and stored at 4° C. for further analysis.

The effect of different particle size on the yield of essential oil with optimized conditions in Supercritical Fluid Extraction with co-solvent has been observed as shown in Table 2. For the particle size 3.35-4.75 mm, 2.0-3.35 mm, 1.0-2.0 mm, and 0.5-1.0 mm average essential oil yield was 0.44%±0.026, 1.73%±0.041, 1.91%±0.059 and 2.18%±0.082. The consumption of $CO_2$ in all these experiments is in the ratio of 1:9 of the raw material. Therefore, it was clear from the abovementioned results that 0.50-1.0 mm particle size showed better results in supercritical fluid extraction process as compared to the other particle sizes.

Table 4 shows the percentage yield of essential oil of different particle size in SFE with co-solvent and total yield at optimized extraction conditions. (*WR-Whole Rhizome)

TABLE 4

| Sr. No. | Particle Size(mm) | Yield % (without co-solvent) | Yield % (with co-solvent) | Total yield (%) |
|---|---|---|---|---|
| 1. | 0.50-1.00 | 4.1 | 2.18 | 6.28 |
| 2. | 1.00-2.00 | 2.73 | 1.91 | 4.64 |
| 3. | 2.00-3.35 | 0.95 | 1.73 | 2.68 |
| 4. | 3.35-4.75 | 0.073 | 0.44 | 0.113 |
| 5. | WR | 0.396 | | |

Example 6 a) Analysis of the Essential Oil/Qualitative Analysis of Chemical Constituents of Essential Oil of *Valeriana jatamansi* Jones.

Gas chromatography (GC) Analysis: The analysis of essential oil sample was performed on Shimadzu Gas Chromatograph GC-2010 equipped with FID and a ZB-5 MS. Ultra-Inert capillary column (5% phenyl methylpolysiloxane) of length 30 m, internal diameter 0.25 mm, film thickness 0.25 μm using Nitrogen (M/s. JK Enterprise, Nasarala, Hoshiarpur, Punjab, India) as auxiliary carrier gas with 1.05 mL/min flow rate; pressure 87.4 kPa; split ratio 10:0. The oven temperature was programmed from 70° C. to 220° C. at the rate of 4° C./min; held isothermally at 70° C. and at 220° C. for 3 and 5 mins, respectively. The sample diluted as 5 μl in 2 ml dichloromethane (DCM) Merck HPLC grade; sample injection volume, 2.0 μl injector port and detector temperature were kept at 240° C. and 250° C. respectively.

Figure 8:
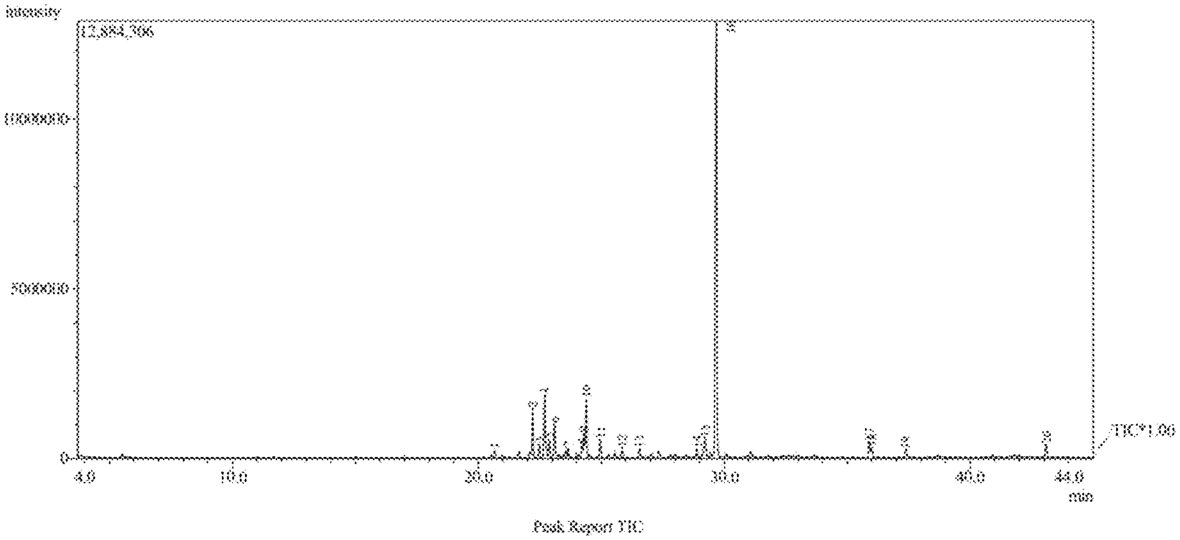
FIG. 8 illustrates GC-MS chromatogram of essential oil of *Valeriana jatamansi* Jones obtained from SFE with $CO_2$ and ethanol as co-solvent of 1.00 mm particle size, in accordance with an embodiment of the present disclosure.
Figure 9:
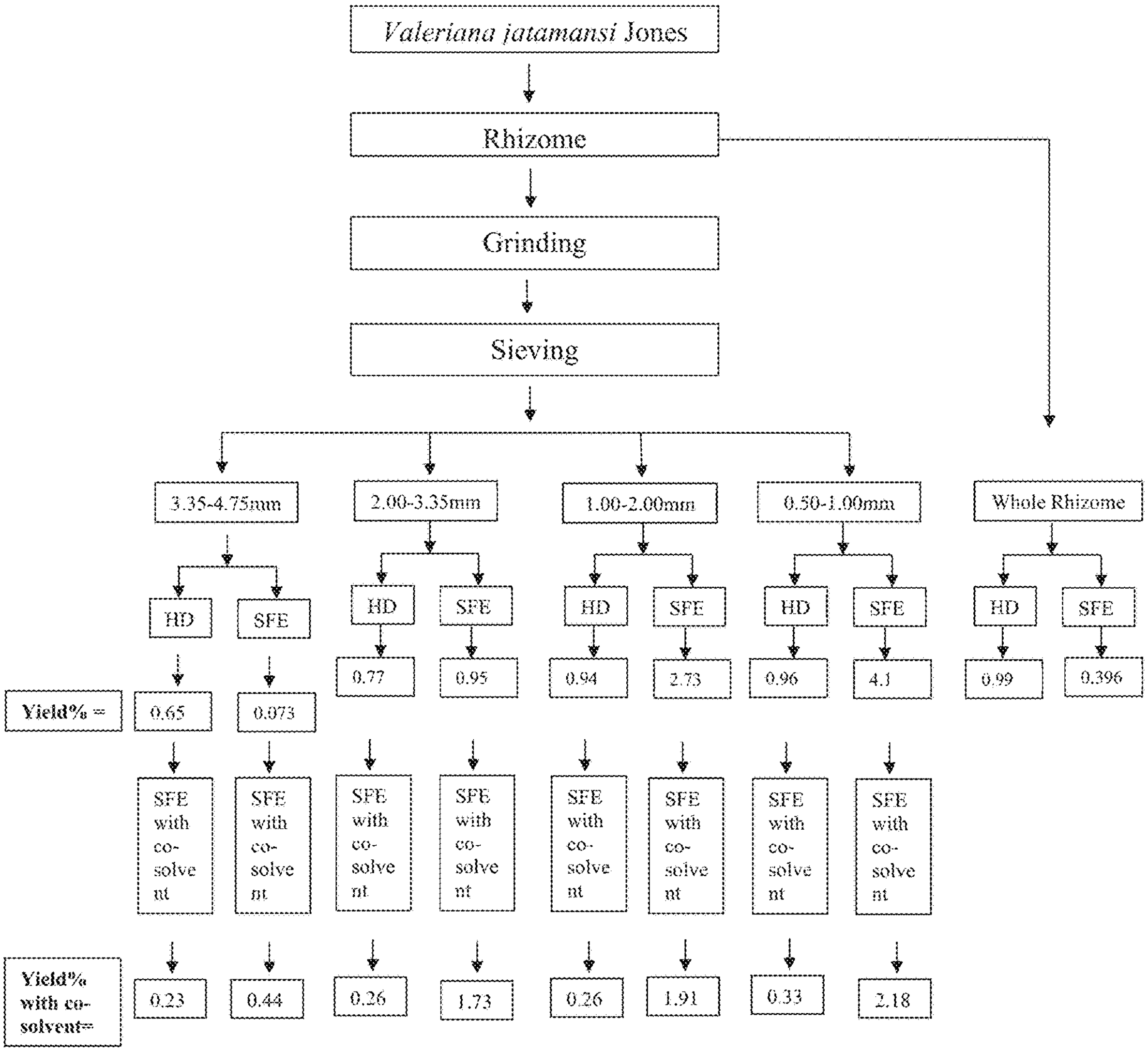
FIG. 9 shows schematic flow diagram of the process and percentage yield of essential oil extracted from hydro-distillation and supercritical fluid extraction process, in accordance with an embodiment of the present disclosure.

Gas chromatography-Mass Spectrometry (GC-MS) Analysis: The analysis of essential oil sample was done using concentration 2 μl/ml in Dichloromethane (DCM) on QP2010 series (Shimadzu, Tokyo, Japan) fitted with AOC-20i auto-sampler and DB-5 MS capillary column (30 m×0.25 mm i.d., film thickness 0.25 μm). Helium (99.99%) pure, (M/s. JK Enterprise, Nasarala, Hoshiarpur, Punjab, India) was used as carrier gas with 1.05 mL/min flow rate; linear velocity 37.6 cm/s; pressure 65.3 kPa; split ratio 10:0; mass scan 40-800 amu at a sampling rate of 1.0 scan/s, scan speed: 1666 u/s, interval: 0.50 s. The oven temperature was programmed from 70° C. to 240° C. at the rate of 4° C./min; held isothermally at 70° C. and at 220° C. for 3 and 5 mins, respectively. Electron impact ionization at 70 eV with 0.9 kV detector voltage. The sample diluted as 5 μl in 2 ml dichloromethane (DCM) HPLC grade; sample injection volume, 2.0 μl ion source temperature 200° C.; interface temperature 250° C.; injector temperature was maintained at 240° C.

b) Characterization of Volatile Compounds:

Identification of constituent compound was carried out with the help of relative retention indices using homologous series of n-alkanes ($C_9$-$C_{22}$) and by comparison of mass spectral data available in the literature, NIST Database and the data listed in the edition of Adam's book. The quantitative composition of individual components was obtained by GC peak area in FID response without using correction factor. Total nineteen constituents were identified representing 79.4% to 90.6% of the total composition in the oil obtained from hydro-distillation and supercritical fluid extraction. Patchouli alcohol was found as major compound ranging from 36.18% to 39.19% in hydro-distillation whereas 68.36% to 69.35% in supercritical fluid extraction process and 53.73% to 55.86% in extraction process using the supercritical fluid Extraction (SFE) with ethanol as co-solvent. Other major compounds identified in the essential oil were β-Patchoulene (3.6%-17.2%), seychellene (0.93%-1.41%), α-Patchoulene (0.42% to 0.84%), δ-Guaiene (0.56%-1.0%). The details of characterized chemical constituents and their average concentration were presented in Table 4 and FIG. 8. Table 5 provides the average percentage chemical composition of essential oil of *Valeriana* jatamansi Jones in SFE and HD

TABLE 5

| Compound | AVERAGE % COMPOSITION | | | |
|---|---|---|---|---|
| | RI | VJ1 | 1MMSFE | 1MMSFECS |
| 3 methylvaleric acid | 968 | 3.5006 | — | — |
| β-Patchoulene | 1379 | 10.85 | — | — |

TABLE 5-continued

| Compound | AVERAGE % COMPOSITION | | | |
|---|---|---|---|---|
| | RI | VJ1 | 1MMSFE | 1MMSFECS |
| Elemene<β-> | 1389 | 0.39 | — | 0.75 |
| Santalene | 1418 | 0.73 | — | — |
| α-Guaiene | 1438 | 4.63 | 0.93 | 4.78 |
| Seychellene | 1451 | 8.40 | 1.41 | 7.72 |
| α-Humulene | 1457 | 1.43 | | 1.89 |
| α-Patchoulene | 1463 | 4.11 | 0.84 | 3.39 |
| Patchoulene | 1466 | 2.67 | | |
| β-Selinene | 1489 | 0.43 | — | |
| α-Selinene | 1496 | 1.51 | — | 1.32 |
| δ-Guaiene | 1501 | 6.63 | 1.0 | 6.01 |
| (−)-Alpha-Panasinsene | 1520 | 2.00 | — | 1.78 |
| Kessane | 1530 | 0.56 | 0.7505 | — |
| Elemol | 1548 | — | 1.08 | — |
| Patchouli alcohol | 1675 | 39.65 | 69.35 | 55.86 |

RI- Retention Indices, VJ1- Essential oil obtained from hydro distillation (0.5-1.00 mm particle size), 1MMSFE- Essential oil obtained from SFE (0.50-1.00 mm particle size), 1MMSFECS-Essential oil obtained from SFE (0.50-1.00 mm particle size) with ethanol as co-solvent.

Advantages of the Present Disclosure

The present invention provides a process to extract essential oil/volatile compound of *Valeriana jatamansi* Jones which is richer in Patchouli alcohol with low consumption of $CO_2$ and time than other extraction methods.

The present invention provides the effect of particle size of the raw material on the essential oil yield in Hydro-distillation and SFE.

The present invention provides the process of SFE to get higher yield of volatile compounds with lesser time consumption.

The present invention provides the process of extraction of essential oil/volatile compound of *Valeriana jatamansi* Jones which provide higher yield than other extraction methods without sacrificing the quality of the same.

The present invention provides the process which is solvent free extraction, environment-friendly which utilizes eco-friendly gas.

Since the present invention provides the optimized process which occur at high pressure and low temperature, therefore the residual material containing valuable molecule can be further explored for isolation of other organic compounds.

The present invention provides the effect of particle size of the raw material of *Valeriana jatamansi* Jones on the essential oil yield in hydro-distillation and supercritical fluid extraction process.

The present invention provides an optimized process and its parameters of Supercritical Fluid Extraction of essential oil of *Valeriana jatamansi* Jones as compared to that of traditional Hydro-distillation and solvent extraction.

The present invention provides the process in which Supercritical Fluid Extraction has advantage over other extraction method in reducing the duration time of extraction of essential oil to 10-15 times.

The present invention provides the process in which the advantage in using supercritical fluid is that it is environment friendly and solvent free extraction process.

The present invention provides the process in which the advantage in using supercritical fluid is that it is easily removed from the product, and it doesn't have its own characteristics hence the product obtained is in its natural condition.

The present invention provides the process in which the supercritical fluid possess the ability to vaporize non-volatile components (at moderate temperatures) which reduces the energy spent, when comparing to distillation.

We claim:

1. A Supercritical Fluid Extraction (SFE) process for extraction of oil from the *Valeriana jatamansi* Jones comprising the steps of, a) grinding the *Valeriana jatamansi* Jones root/rhizome; and b) extracting the grounded root/rhizome using supercritical carbon dioxide ($CO_2$) in Supercritical Carbon Dioxide Extractor to obtain an essential oil, wherein particle size of rhizome/root is in a range of 0.50-4.75 mm;

the process is conducted at a pressure range of 200 to 400 bars, at a temperature range of 35° C. to 50° C., at $CO_2$ flow rate in the range of 54 to 60 g/min, and the ratio of root/rhizome to carbon dioxide is in a range of 1:10 to 1:19; and the essential oil comprises Patchouli alcohol content in the range of 53.73% to 69.35%.

2. The SFE process as claimed in claim 1, comprising further extracting the grounded root/rhizome in presence of a polar co-solvent.

3. The SFE process as claimed in claim 2, wherein the polar co-solvent is ethanol.

4. The SFE process as claimed in claim 1, wherein the essential oil yield at a temperature of 45° C. and a pressure range of 220 to 310 bars is 1.6 to 4.1%.

5. The SFE process as claimed in claim 1, wherein the essential oil yield at a temperature of 45° C. and a pressure of 310 bars is 4.1%.

6. The SFE process as claimed in claim 1, wherein the essential oil yield at a temperature of 45° C. and a pressure of 310 bars with the particle size of the grounded root/rhizome in the range of 0.50-4.75 mm is 0.073-4.1%.

7. The SFE process as claimed in claim 1, wherein the essential oil yield at a temperature of 45° C. and a pressure of 310 bars for the particle size of the grounded root/rhizome in a range of 0.50-1.00 mm is 4.1% without the co-solvent, and further extraction with co-solvent yields 2.18% essential oil having total essential oil yield from roots is 6.28% (w/w).

8. The SFE process as claimed in claim 1, wherein the essential oil comprises 68.36% to 69.35% Patchouli alcohol.

9. The SFE process as claimed in claim 2, wherein the essential oil obtained from the Supercritical Fluid Extraction (SEE) with ethanol as co-solvent comprises 53.73% to 55.86% concentration of Patchouli alcohol.

* * * * *